United States Patent
Cheng et al.

(10) Patent No.: US 10,755,701 B2
(45) Date of Patent: Aug. 25, 2020

(54) METHOD AND APPARATUS FOR CONVERTING ENGLISH SPEECH INFORMATION INTO TEXT

(71) Applicant: BAIDU ONLINE NETWORK TECHNOLOGY (BEIJING) CO., LTD., Beijing (CN)

(72) Inventors: Qiang Cheng, Beijing (CN); Sheng Qian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 233 days.

(21) Appl. No.: 16/044,926

(22) Filed: Jul. 25, 2018

(65) Prior Publication Data
US 2019/0088253 A1    Mar. 21, 2019

(30) Foreign Application Priority Data

Sep. 20, 2017    (CN) .......................... 2017 1 0854473

(51) Int. Cl.
| | |
|---|---|
| *G10L 15/00* | (2013.01) |
| *G10L 15/187* | (2013.01) |
| *G10L 15/22* | (2006.01) |
| *G10L 15/14* | (2006.01) |
| *G06F 3/16* | (2006.01) |
| *G10L 15/26* | (2006.01) |
| *G10L 15/02* | (2006.01) |

(52) U.S. Cl.
CPC ............ *G10L 15/187* (2013.01); *G06F 3/167* (2013.01); *G10L 15/14* (2013.01); *G10L 15/22* (2013.01); *G10L 15/02* (2013.01); *G10L 2015/025* (2013.01)

(58) Field of Classification Search
CPC ....... G10L 15/187; G10L 15/22; G10L 15/14; G10L 2015/025; G10L 15/02; G10L 13/08; G10L 15/1807; G10L 15/26; G06F 3/167
USPC ........................................................ 704/235
See application file for complete search history.

(56) References Cited

U.S. PATENT DOCUMENTS

2014/0303961 A1* 10/2014 Leydon ................... G06F 40/40
704/2

FOREIGN PATENT DOCUMENTS

| CN | 101415259 | 4/2009 |
|---|---|---|
| CN | 101447184 | 6/2009 |
| JP | 4962962 | 6/2012 |

OTHER PUBLICATIONS

SIPO, First Office Action for CN Application No. 201710854473.1, dated Feb. 6, 2020.

* cited by examiner

*Primary Examiner* — Thierry L Pham
(74) *Attorney, Agent, or Firm* — Hodgson Russ LLP

(57) ABSTRACT

The present disclosure proposes a method and an apparatus for converting English speech information into a text. The method may include: receiving the English speech information inputted by a user, determining a target speech recognition model according to a preset algorithm, and identifying original phonemes of the English speech information by applying the target speech recognition model; performing a matching on the original phonemes by applying a phonetic model generated by pre-training English texts and a preset probability model, and determining a target phoneme matched successfully; and acquiring a target English text corresponding to the target phoneme, and displaying the target English text on a speech conversion textbox.

18 Claims, 3 Drawing Sheets pronunciation feature information of the English speech information is extracted — 201 a first probability of the pronunciation feature information matching with the first speech recognition model and a second probability of the pronunciation feature information matching with the second speech recognition model are computed according to the pronunciation feature information — 202 the target speech recognition model is determined according to the first probability and the second probability — 203

METHOD AND APPARATUS FOR CONVERTING ENGLISH SPEECH INFORMATION INTO TEXT

CROSS-REFERENCE TO RELATED APPLICATION

The present application is based upon and claims priority to Chinese Patent Application No. 201710854473.1, filed on Sep. 20, 2017, the entirety contents of which are incorporated herein by reference.

FIELD

The present disclosure relates to a field of speech processing technology, and more particularly to a method and an apparatus for converting English speech information into a text.

BACKGROUND

Artificial intelligence (AI for short) is a new technology for studying and developing theories, methods, technologies and application systems for simulating, extending and expanding human intelligence. AI is a branch of computer science, intending to know essence of intelligence and to produce an intelligent machine able to act in a way similar to that of human intelligence. Researches on the AI field refer to robots, speech recognition, image recognition, natural language processing and expert systems etc. A significant branch of AI is the speech recognition technology.

SUMMARY

Embodiments of the present disclosure seek to solve at least one of the problems existing in the related art to at least some extent.

Embodiments of the present disclosure provide a method for converting English speech information into a text. The method may include: receiving the English speech information inputted by a user, determining a target speech recognition model according to a preset algorithm, and identifying original phonemes of the English speech information by applying the target speech recognition model; performing a matching on the original phonemes by applying a phonetic model generated by pre-training English texts and a preset probability model, and determining a target phoneme matched successfully; and acquiring a target English text corresponding to the target phoneme, and displaying the target English text on a speech conversion textbox.

Embodiments of the present disclosure provide an apparatus for converting English speech information into a text. The apparatus may include: one or more processors; a memory storing instructions executable by the one or more processors; in which the one or more processors are configured to: receive the English speech information inputted by a user, and to determine a target speech recognition model according to a preset algorithm; identify original phonemes of the English speech information by applying the target speech recognition model; perform a matching on the original phonemes by applying a phonetic model generated by pre-training English texts and a preset probability model, and to determine a target phoneme matched successfully; and acquire a target English text corresponding to the target phoneme; and display the target English text on a speech conversion textbox.

Embodiments of the present disclosure provide a non-transitory computer-readable storage medium having a computer program stored thereon, in which when the computer program is executed by a processor, the processor is caused to perform the method for converting English speech information into a text according to the above-described embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the accompanying drawings, in which.

DETAILED DESCRIPTION

Figure 1:
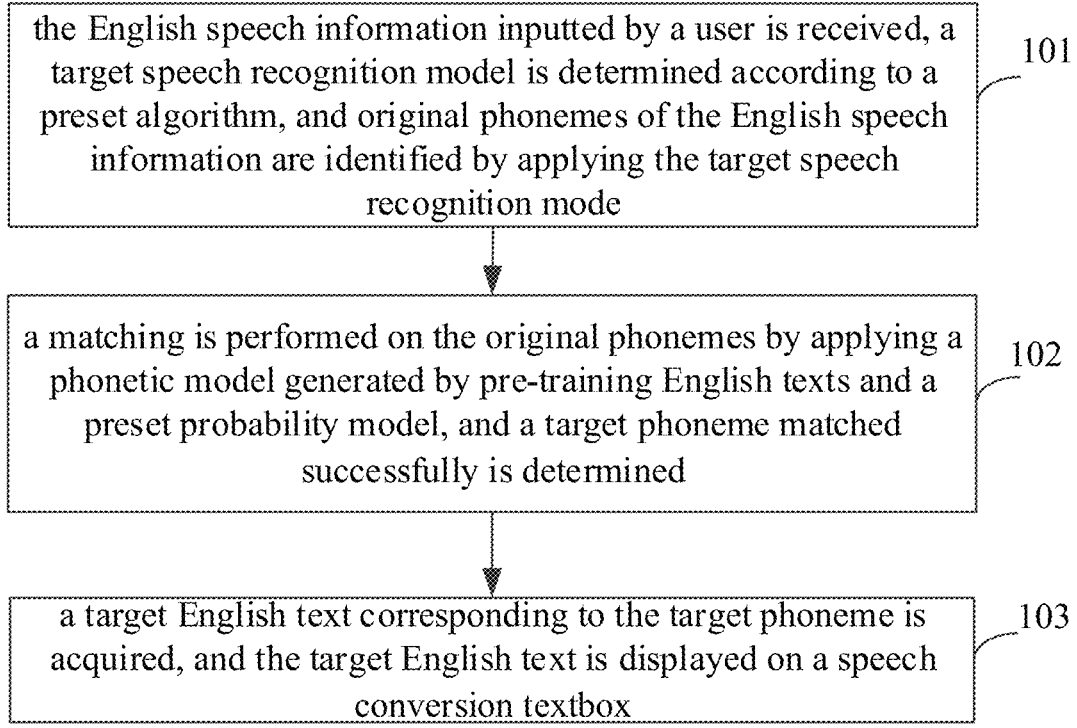
FIG. 1 is a flow chart of a method for converting English speech information into a text according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A method and an apparatus for converting English speech information into a text according to embodiments of the present disclosure will be described with reference to drawings.

In related arts, the speech recognition technology mainly focuses on recognition of Chinese speech inputted by a user. However, the English version and pronunciation are significantly different from the Chinese version and pronunciation, and applying the Chinese speech recognition technology to recognize English speech may cause an inaccurate or erroneous recognition results.

In order to solve the above technical problem, the present disclosure provides recognition technology for English speech, to improve the accuracy of the English speech recognition.

FIG. 1 is a flow chart of a method for converting English speech information into a text according to an embodiment of the present disclosure. The method may include followings.

At block 101, the English speech information inputted by a user is received, a target speech recognition model is determined according to a preset algorithm, and original phonemes of the English speech information are identified by applying the target speech recognition model.

In embodiments of the present disclosure, according to different application scenarios, the English voice information inputted by the user may be received in different manners. As a possible implementation manner, the user's English speech information is received in real time through a voice device such as a microphone in the terminal device. As another possible implementation manner, the English speech information in the user's digital voice file according to the user's selection.

Specifically, in embodiments of the present disclosure, the English speech information inputted by a user is received, a target speech recognition model is determined according to a preset algorithm, and original phonemes of the English speech information are identified by applying the target speech recognition model. The original phonemes are the minimum units of English pronunciation. Thus, the phonetic notation may be performed according to the structure of the English pronunciation, and the phonetic recognition of the English speech is performed based on a preset target speech recognition model, making the error smaller than that when the speech-text conversion on the received English speech directly.

It should be noted that, preset algorithms for determining the target speech recognition model are different according to different application scenarios. Examples are taken as follows.

As a possible implementation manner, the preset algorithm may be deep learning algorithm. Deep learning is a kind of machine learning based on performing a characterizing learning on data. The observed value (such as an image) may be represented in various manners such as using a vector of each pixel intensity value, or may be represented as a series of edges, regions of a particular shape and the like. It is easier to learn tasks from instances using some specific representing manners. Compared to acquiring features manually, the deep learning algorithm extracts features by unsupervised or semi-supervised feature learning and hierarchical feature extraction efficient algorithms, which has a high accuracy and efficiency.

Specifically, in this example, a sample set of English terms identified by Chinese phonemes is trained by applying the deep learning algorithm to generate a first speech recognition model, and the sample set of English terms identified by English phonemes is trained by applying the deep learning algorithm to generate a second speech recognition model. Therefore, the English speech pronounced in a standard English pronunciation and the English speech having a Chinese accent are separated to different speech recognition models for identification, avoiding a problem of inaccurate recognition in a case of "Chinglish" pronunciation. By applying the first speech recognition model and the second speech recognition model, the speech pronounced in a standard English pronunciation and the speech having a Chinese accent may be accurately identified.

In another embodiment of the present disclosure, when a piece of voice only including speech pronounced in a standard English pronunciation or the speech having a Chinese accent, the speech recognition model required in the current scenario may be determined according to probabilities of the pronunciation feature information matching with the first speech recognition model and the second speech recognition model.

Figure 2:
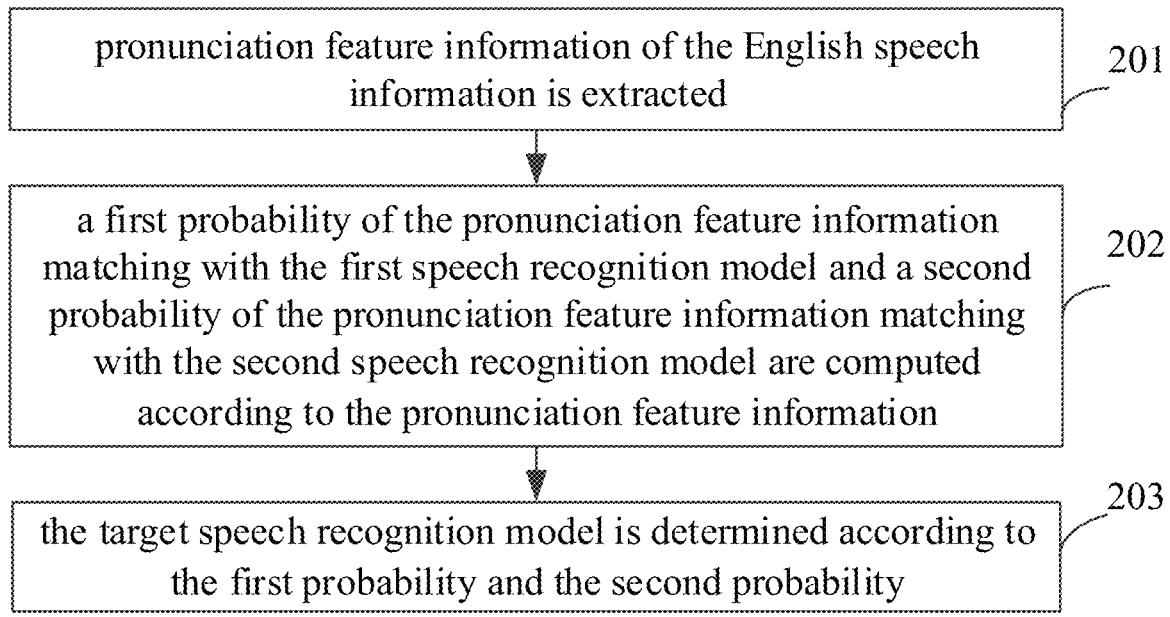
FIG. 2 is a flow chart of a method for converting English speech information into a text according to another embodiment of the present disclosure.

As illustrated in FIG. 2, the speech recognition model required in the current scenario may be determined in following acts.

At block 201, pronunciation feature information of the English speech information is extracted.

The pronunciation feature information includes a phonetic symbol, a pause, an accent (or a stressed tone), a light tone, etc.

Specifically, the sound analysis algorithm may be used to extract the pronunciation feature information of the English speech information. In an embodiment, the neural network analysis model may be preset, and the English speech may be inputted into the preset neural network analysis model to obtain the pronunciation feature information outputted by the model.

At block 202, a first probability of the pronunciation feature information matching with the first speech recognition model and a second probability of the pronunciation feature information matching with the second speech recognition model are computed according to the pronunciation feature information.

Specifically, in order to determine the speech recognition model matched to the present English speech, the pronunciation feature information is matched with the first and second speech recognition model, and the first probability of the pronunciation feature information matching with the first speech recognition model and the second probability of the pronunciation feature information matching with the second speech recognition model are computed according to the pronunciation feature information.

At block 203, the target speech recognition model is determined according to the first probability and the second probability.

Specifically, in an embodiment of the present disclosure, if the first probability of the pronunciation feature information matching with the first speech recognition model computed according to the pronunciation feature information is greater than the second probability of the pronunciation feature information matching with the second speech recognition model computed according to the pronunciation feature information, it is indicated that the present English speech is not pronounced in a standard English pronunciation and has a Chinese accent. Therefore, the first speech recognition model may be determined as the target speech recognition model.

In an embodiment of the present disclosure, if the first probability of the pronunciation feature information matching with the first speech recognition model computed according to the pronunciation feature information is smaller than or equal to the second probability of the pronunciation feature information matching with the second speech recognition model computed according to the pronunciation feature information, it is indicated that the present English speech includes standard pronounced speech. Therefore, the second speech recognition model may be determined as the target speech recognition model.

At block 102, a matching is performed on the original phonemes by applying a phonetic model generated by pre-training English texts and a preset probability model, and a target phoneme matched successfully is determined.

It should be understood that, by generating the phonetic model by pre-training massive English texts, the phonetic model may be applied to convert the original phonemes in the English speech information which is not pronounced in a standard English pronunciation to standard target phonemes.

Of course, in this example, for some original phonemes with a relatively ambiguous pronunciation, it may not be possible to acquire a unique matched target phoneme, in other words, there might be a plurality of target phonemes matched to each of these original phonemes. At this time, the matching probability of the original phoneme and each of the plurality of target phonemes may be determined by the preset probability model, such that the target phoneme with the closest pronunciation may be determined according to the matching probability.

In the above-described example of training the sample set of English terms identified by Chinese phonemes by applying the deep learning algorithm to generate the first speech recognition model and training the sample set of English terms identified by English phonemes by applying the deep learning algorithm to generate the second speech recognition model, the manner of identifying original phonemes of the English speech information by applying the target speech recognition model and performing a matching on the original phonemes by applying a phonetic model generated by pre-training English texts and a preset probability model will be described in followings.

Chinese original phonemes corresponding to the English speech information are identified by applying the first speech recognition model, and the matching is performed on the original phonemes by applying a Chinese phoneme phonetic model generated by pre-training the English texts and the preset probability model.

In other words, in this example, when the English speech has Chinese accent, Chinese original phonemes corresponding to the English speech information are identified by applying the first speech recognition model, and the matching is performed on the original phonemes by applying a Chinese phoneme phonetic model generated by pre-training the English texts and the preset probability model.

In an embodiment, English original phonemes corresponding to the English speech information are identified by applying the second speech recognition model, and the matching is performed on the original phonemes by applying an English phoneme phonetic model generated by pre-training the English texts and the preset probability model.

In other words, in this example, when the English speech is pronounced in a standard English pronunciation, English original phonemes corresponding to the English speech information are identified by applying the second speech recognition model, and the matching is performed on the original phonemes by applying an English phoneme phonetic model generated by pre-training the English texts and the preset probability model.

At block 103, a target English text corresponding to the target phoneme is acquired, and the target English text is displayed on a speech conversion textbox.

Specifically, after the target phoneme is determined, the target English text corresponding to the target phoneme is acquired, and the target English text is displayed on a speech conversion textbox, such that the process for phonetic notating the English speech and converting the English speech to the text is finished. In this process, the target phoneme is acquired from the original phonemes and then converted to the corresponding target English text, thereby realizing a learning and annotation of English terms, such that the pronunciation of new English terms may be acquired in an appropriate manner and the accuracy of speech recognition by a recognition system.

It should be noted that, due to the particularity of English pronunciation, in practical applications, the target phoneme matched successfully may be located in a plurality of different English phrases, and/or a plurality of different English letters. A plurality of different English phrases corresponding to the target phoneme may be combined in a pronunciation order, and/or a plurality of different English letters corresponding to the target phoneme may be combined in a pronunciation order, such that a target English text may be generated. The pronunciation order may be determined according to at least one of English Alphabet and International Phonetic Alphabet (including DJ phonetic symbols, K.K. phonetic symbols and the like).

In conclusion, with the method for converting English speech information into a text according to embodiments of the present disclosure, the English speech information inputted by a user is received, a target speech recognition model is determined according to a preset algorithm, and original phonemes of the English speech information are identified by applying the target speech recognition model. In addition, a matching is performed on the original phonemes by applying a phonetic model generated by pre-training English texts and a preset probability model, and a target phoneme matched successfully is determined. Moreover, a target English text corresponding to the target phoneme is acquired, and the target English text is displayed on a speech conversion textbox. Therefore, a phonetic notation may be performed according to the pronunciation of the English speech, and the English texts may be converted after a standardized processing is performed on results of the phonetic notation, thereby realizing the recognition of the English speech, which has a high accuracy and expands application fields of speech identification.

Figure 3:
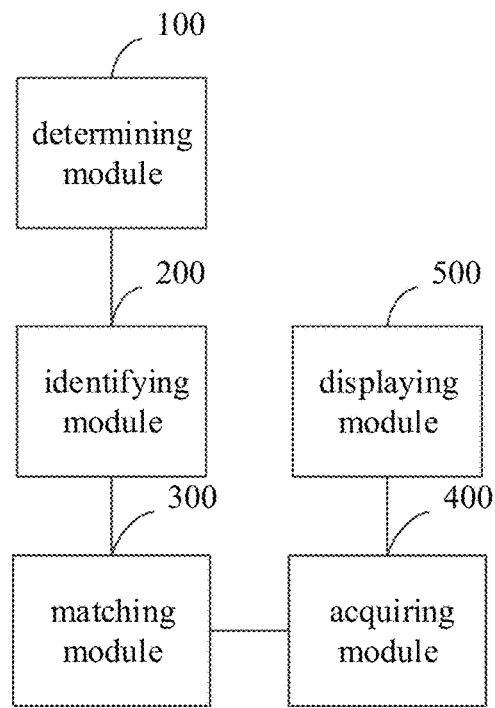
FIG. 3 is a block diagram of an apparatus for converting English speech information into a text according to an embodiment of the present disclosure.

In order to implement the above embodiments, embodiments of the present disclosure also provide an apparatus for converting English speech information into a text. FIG. 3 is a block diagram of an apparatus for converting English speech information into a text according to an embodiment of the present disclosure. As illustrated in FIG. 3, the apparatus for converting English speech information into a text may include: a determining module 100, an identifying module 200, a matching module 300, an acquiring module 400 and a displaying module 500.

The determining module 100 is configured to receive the English speech information inputted by a user, and to determine a target speech recognition model according to a preset algorithm.

The identifying module 200 is configured to identify original phonemes of the English speech information by applying the target speech recognition model.

The matching module 300 is configured to perform a matching on the original phonemes by applying a phonetic model generated by pre-training English texts and a preset probability model, and to determine a target phoneme matched successfully.

The acquiring module 400 is configured to acquire a target English text corresponding to the target phoneme.

The displaying module 500 is configured to display the target English text on a speech conversion textbox.

Figure 4:
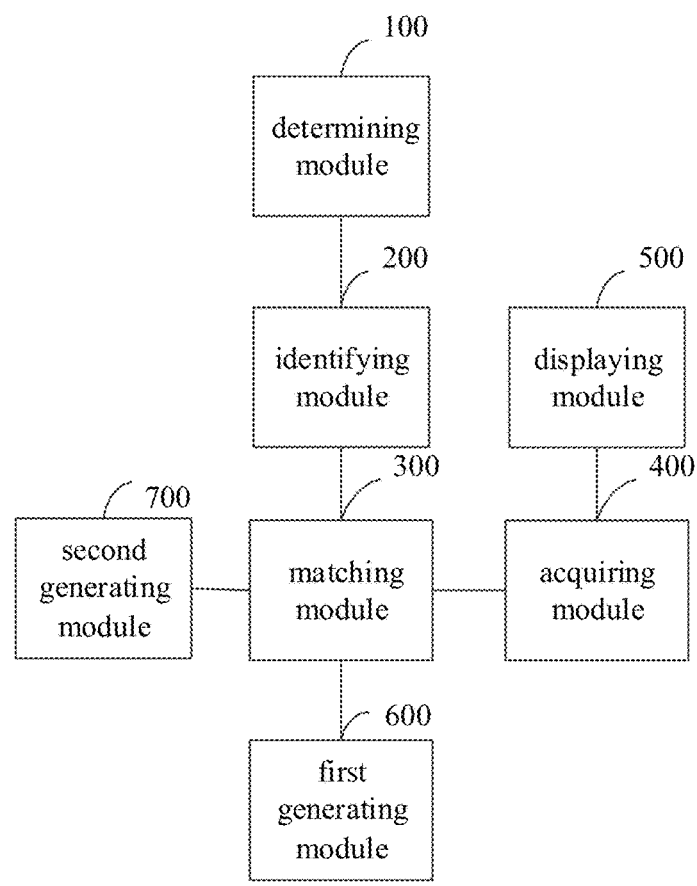
FIG. 4 is a block diagram of an apparatus for converting English speech information into a text according to another embodiment of the present disclosure.

Further, as illustrated in FIG. 4, on the basis of the embodiment illustrated in FIG. 3, the apparatus for converting English speech information into a text may also include a first generating module 600 and a second generating module 700.

The first generating module 600 is configured to train a sample set of English terms identified by Chinese phonemes by applying a deep learning algorithm, to generate a first speech recognition model.

The second generating module 700 is configured to train the sample set of English terms identified by English phonemes by applying the deep learning algorithm, to generate a second speech recognition model.

It should be noted that, the description of the method for converting English speech information into a text in the method embodiments of the present disclosure is also suitable for the apparatus for converting English speech information into a text in the apparatus embodiments. Details which are not disclosed in the apparatus embodiments will not be described in detail herein.

In conclusion, with the apparatus for pushing information according to embodiments of the present disclosure, the English speech information inputted by a user is received, a target speech recognition model is determined according to a preset algorithm, and original phonemes of the English speech information are identified by applying the target speech recognition model. In addition, a matching is performed on the original phonemes by applying a phonetic model generated by pre-training English texts and a preset probability model, and a target phoneme matched successfully is determined. Moreover, a target English text corresponding to the target phoneme is acquired, and the target English text is displayed on a speech conversion textbox. Therefore, a phonetic notation may be performed according to the pronunciation of the English speech, and the English texts may be converted after a standardized processing is performed on results of the phonetic notation, thereby realizing the recognition of the English speech, which has a high accuracy and expands application fields of speech identification.

Figure 5:
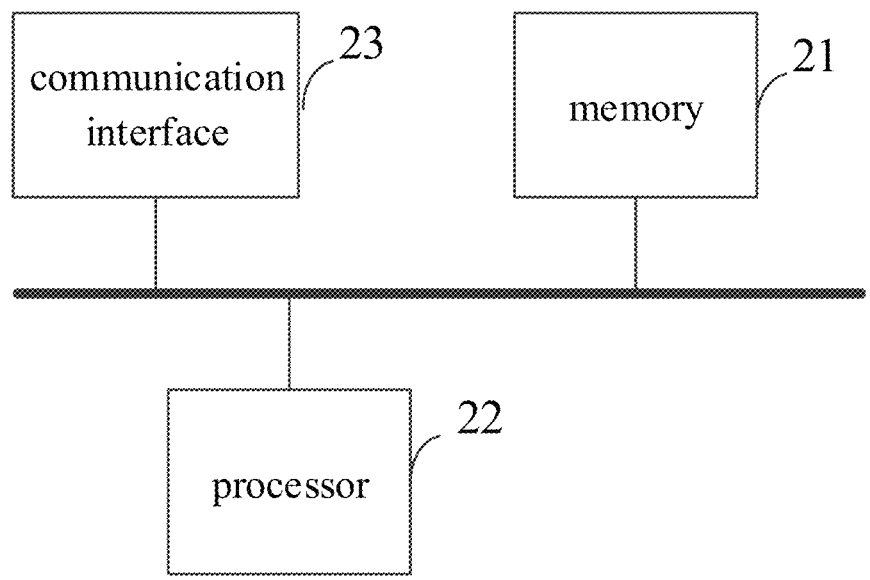
FIG. 5 is a block diagram of a computer device according to an embodiment of the present disclosure.

In order to implement the above embodiments, the present disclosure further provides a computer device. FIG. 5 is a block diagram of the computer device according to an embodiment of the present disclosure. As illustrated in FIG. 5, the computer device may include a memory 21, a processor 22 and a computer program stored on the memory 21 and executable on the processor 22.

The processor 22 is configured to perform the method for converting English speech information into a text according to the above-described embodiments.

Further, the computer device may also include: a communication interface 23. The memory 21 and the processor 22 may be communicated via the communication interface 23.

The memory 21 is configured to store the computer program executable on the processor 22.

The memory 21 may include a high speed RAM memory and may also include a non-volatile memory such as at least one disk memory.

When the above-mentioned computer program is executed, the processor 22 is configured to implement the method for converting English speech information into a text.

If the memory 21, the processor 22, and the communication interface 23 are independently implemented, the communication interface 23, the memory 21, and the processor 22 may be connected and communicated with each other via a bus. The bus may be an Industry Standard Architecture (ISA) bus, a Peripheral Component (PCI) bus, or an Extended Industry Standard Architecture (EISA) bus and the like. The bus can be divided into an address bus, a data bus, a control bus, and the like. For convenient representation, the bus is represented by only one thick line in FIG. 5, which should not be understood that there is only one bus or one type of bus.

In an embodiment, in a specific implementation, if the memory 21, the processor 22, and the communication interface 23 are integrated on a chip, the memory 21, the processor 22, and the communication interface 23 may communicate with each other via an internal interface.

The processor 22 may be a central processing unit (CPU), or an application specific integrated circuit (ASIC), or may be configured as one or more integrated circuits to implement the embodiments of the present disclosure.

In order to implement the above embodiments, the present disclosure further provides a non-transitory computer-readable storage medium having instructions stored thereon, in which when the instructions are executed by a processor, the processor is caused to perform the method for converting English speech information into a text according to the above-described embodiments.

In order to implement the above embodiments, the present disclosure further provides a computer program product, in which when instructions in the computer program product are executed by a processor, the processor is caused to perform the method for converting English speech information into a text according to the above-described embodiments.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Additionally, those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for converting English speech information into a text, comprising:
   receiving the English speech information inputted by a user, determining a target speech recognition model according to a preset algorithm, and identifying original phonemes of the English speech information by applying the target speech recognition model;
   performing a matching on the original phonemes by applying a phonetic model generated by pre-training English texts and a preset probability model, and determining a target phoneme matched successfully; and
   acquiring a target English text corresponding to the target phoneme, and displaying the target English text on a speech conversion textbox;
   wherein before determining the target speech recognition model according to the preset algorithm, the method comprises:
   training a sample set of English terms identified by Chinese phonemes by applying a deep learning algorithm, to generate a first speech recognition model; and
   training the sample set of English terms identified by English phonemes by applying the deep learning algorithm, to generate a second speech recognition model.

2. The method according to claim 1, wherein determining the target speech recognition model according to the preset algorithm comprises:
   extracting pronunciation feature information of the English speech information;
   computing a first probability of the pronunciation feature information matching with the first speech recognition model and a second probability of the pronunciation feature information matching with the second speech recognition model according to the pronunciation feature information; and
   determining the target speech recognition model according to the first probability and the second probability.

3. The method according to claim 1, wherein identifying the original phonemes of the English speech information by applying the target speech recognition model and performing the matching on the original phonemes by applying the phonetic model generated by pre-training English texts and the preset probability model comprise:
   identifying Chinese original phonemes corresponding to the English speech information by applying the first speech recognition model; and
   performing the matching on the original phonemes by applying a Chinese phoneme phonetic model generated by pre-training the English texts and the preset probability model.

4. The method according to claim 1, wherein identifying the original phonemes of the English speech information by applying the target speech recognition model and performing the matching on the original phonemes by applying the phonetic model generated by pre-training English texts and the preset probability model comprise:
   identifying English original phonemes corresponding to the English speech information by applying the second speech recognition model; and
   performing the matching on the original phonemes by applying an English phoneme phonetic model generated by pre-training the English texts and the preset probability model.

5. The method according to claim 2, wherein extracting the pronunciation feature information of the English speech information comprises at least one of:
   extracting the pronunciation feature information of the English speech information using a sound analysis algorithm; and
   presetting a neural network analysis model, inputting the English speech into the neural network analysis model, and acquiring the pronunciation feature information of the English speech information from the neural network analysis model.

6. The method according to claim 2, wherein determining the target speech recognition model according to the first probability and the second probability comprises:

when the first probability is greater than the second probability, determining the first speech recognition model as the target speech recognition model; and when the first probability is smaller than or equal to the second probability, determining the second speech recognition model as the target speech recognition model.

7. The method according to claim 1, wherein when the target phoneme matched successfully is located in a plurality different English phrases, acquiring the target English text corresponding to the target phoneme comprises:

combining the plurality different English phrases corresponding to the target phoneme in a pronunciation order, to generate the target English text.

8. The method according to claim 1, wherein when the target phoneme matched successfully is located in a plurality of different English letters, acquiring the target English text corresponding to the target phoneme comprises:

combining the plurality of different English letters corresponding to the target phoneme in the pronunciation order, to generate the target English text.

9. The method according to claim 1, wherein the original phonemes are minimum units of English pronunciation.

10. An apparatus for converting English speech information into a text, comprising:

one or more processors;

a memory storing instructions executable by the one or more processors;

wherein the one or more processors are configured to:

receive the English speech information inputted by a user, and to determine a target speech recognition model according to a preset algorithm;

identify original phonemes of the English speech information by applying the target speech recognition model;

perform a matching on the original phonemes by applying a phonetic model generated by pre-training English texts and a preset probability model, and to determine a target phoneme matched successfully;

acquire a target English text corresponding to the target phoneme; and display the target English text on a speech conversion textbox;

wherein the one or more processors are further configured to:

train a sample set of English terms identified by Chinese phonemes by applying a deep learning algorithm, to generate a first speech recognition model; and train the sample set of English terms identified by English phonemes by applying the deep learning algorithm, to generate a second speech recognition model.

11. The apparatus according to claim 10, wherein the one or more processors are further configured to:

extract pronunciation feature information of the English speech information;

compute a first probability of the pronunciation feature information matching with the first speech recognition model and a second probability of the pronunciation feature information matching with the second speech recognition model according to the pronunciation feature information; and determine the target speech recognition model according to the first probability and the second probability.

12. The apparatus according to claim 10, wherein the one or more processors are further configured to identify the original phonemes of the English speech information by applying the target speech recognition model and perform the matching on the original phonemes by applying the phonetic model generated by pre-training English texts and the preset probability model by acts of:

identifying Chinese original phonemes corresponding to the English speech information by applying the first speech recognition model; and performing the matching on the original phonemes by applying a Chinese phoneme phonetic model generated by pre-training the English texts and the preset probability model.

13. The apparatus according to claim 10, wherein the one or more processors are further configured to identify the original phonemes of the English speech information by applying the target speech recognition model and perform the matching on the original phonemes by applying the phonetic model generated by pre-training English texts and the preset probability model by acts of:

identifying English original phonemes corresponding to the English speech information by applying the second speech recognition model; and performing the matching on the original phonemes by applying an English phoneme phonetic model generated by pre-training the English texts and the preset probability model.

14. The apparatus according to claim 11, wherein the ore or more processor are configured to extract the pronunciation feature information of the English speech information by at least one of acts of:

extracting the pronunciation feature information of the English speech information using a sound analysis algorithm; and presetting a neural network analysis model, inputting the English speech into the neural network analysis model, and acquiring the pronunciation feature information of the English speech information from the neural network analysis model.

15. The apparatus according to claim 11, wherein the one or more processors are configured to determine the target speech recognition model according to the first probability and the second probability by acts of:

when the first probability is greater than the second probability, determining the first speech recognition model as the target speech recognition model; and when the first probability is smaller than or equal to the second probability, determining the second speech recognition model as the target speech recognition model.

16. The apparatus according to claim 10, wherein when the target phoneme matched successfully is located in a plurality different English phrases, the one or more processors are configured to acquire the target English text corresponding to the target phoneme by acts of:

combining the plurality different English phrases corresponding to the target phoneme in a pronunciation order, to generate the target English text.

17. The apparatus according to claim 10, wherein when the target phoneme matched successfully is located in a plurality different English phrases, the one or more processors are configured to acquire the target English text corresponding to the target phoneme by acts of:

combining the plurality of different English letters corresponding to the target phoneme in the pronunciation order, to generate the target English text.

18. A non-transitory computer-readable storage medium having a computer program stored thereon, wherein when the computer program is executed by a processor, the processor is caused to perform the method for converting English speech information into a text, comprising:
- receiving the English speech information inputted by a user, determining a target speech recognition model according to a preset algorithm, and identifying original phonemes of the English speech information by applying the target speech recognition model;
- performing a matching on the original phonemes by applying a phonetic model generated by pre-training English texts and a preset probability model, and determining a target phoneme matched successfully; and
- acquiring a target English text corresponding to the target phoneme, and displaying the target English text on a speech conversion textbox;
- wherein before determining the target speech recognition model according to the preset algorithm, the method comprises:
  - training a sample set of English terms identified by Chinese phonemes by applying a deep learning algorithm, to generate a first speech recognition model; and
  - training the sample set of English terms identified by English phonemes by applying the deep learning algorithm, to generate a second speech recognition model.

* * * * *